United States Patent
Wang et al.

(10) Patent No.: US 9,936,547 B2
(45) Date of Patent: Apr. 3, 2018

(54) MULTI-MODE CONTROL FOR SOLID STATE LIGHTING

(71) Applicant: DIALOG SEMICONDUCTOR INC., Campbell, CA (US)

(72) Inventors: Xiaoyan Wang, Milpitas, CA (US); Guang Feng, Cupertino, CA (US); Nan Shi, Newark, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days.

(21) Appl. No.: 15/509,845

(22) PCT Filed: Sep. 15, 2015

(86) PCT No.: PCT/US2015/050300
§ 371 (c)(1),
(2) Date: Mar. 8, 2017

(87) PCT Pub. No.: WO2016/044351
PCT Pub. Date: Mar. 24, 2016

(65) Prior Publication Data
US 2017/0251532 A1    Aug. 31, 2017

Related U.S. Application Data

(60) Provisional application No. 62/050,689, filed on Sep. 15, 2014.

(51) Int. Cl.
H05B 33/08 (2006.01)
(52) U.S. Cl.
CPC ..... *H05B 33/0815* (2013.01); *H05B 33/0845* (2013.01); *H05B 33/0884* (2013.01);
(Continued)

(58) Field of Classification Search
CPC ............ H05B 33/0815; H05B 33/0845; H05B 33/083; H05B 33/0848; H05B 33/0887;
(Continued)

(56) References Cited

U.S. PATENT DOCUMENTS

| | | | | |
|---|---|---|---|---|
| 6,977,472 B2 * | 12/2005 | Matsubayashi | .... | H05B 41/2806 315/291 |
| 8,022,634 B2 * | 9/2011 | Greenfeld | .......... | H05B 33/0815 315/185 R |

(Continued)

OTHER PUBLICATIONS

PCT International Search Report and Written Opinion, PCT/US2015/050300, dated Jan. 20, 2016, 12 Pages.

*Primary Examiner* — Douglas W Owens
*Assistant Examiner* — Borna Alaeddini
(74) *Attorney, Agent, or Firm* — Fenwick & West LLP

(57) ABSTRACT

A multi-mode control scheme for an LED lamp system uses the detected firing angle of an AC input voltage waveform to select from multiple regulation modes. In operation, a current controller compares the detected firing angle to one or more specified thresholds and selects the appropriate regulation scheme based on the comparison result. When the detected firing angle is less than a first firing angle threshold, the controller employs a current shaping regulation mode. When the detected firing angle is greater than a second firing angle threshold, the controller employs a switching cycle-I Peak modulation regulation mode. And when the detected firing angle is greater than the first firing angle threshold and less than the second firing angle threshold, the controller employs a hybrid regulation mode.

15 Claims, 4 Drawing Sheets

(52) U.S. Cl.
CPC ....... *H05B 33/0887* (2013.01); *H05B 33/083* (2013.01); *H05B 33/0806* (2013.01); *H05B 33/0809* (2013.01)

(58) Field of Classification Search
CPC ................ H05B 37/02; H05B 33/0809; H05B 33/0812; H05B 33/0818; H05B 33/0842; H05B 33/0851; H05B 37/0254; H05B 33/0884; H05B 33/0806; Y02B 20/346; Y02B 70/12
See application file for complete search history.

(56) References Cited

U.S. PATENT DOCUMENTS

| | | | |
|---|---|---|---|
| 8,552,942 B2 * | 10/2013 | Hua | H05B 33/0815 345/77 |
| 8,704,462 B2 * | 4/2014 | Shteynberg | H05B 33/0815 315/209 R |
| 2007/0182338 A1 * | 8/2007 | Shteynberg | H05B 33/0815 315/200 R |
| 2013/0141001 A1 * | 6/2013 | Datta | H05B 33/0809 315/224 |
| 2014/0103838 A1 * | 4/2014 | Zheng | H05B 33/0815 315/307 |
| 2014/0159616 A1 * | 6/2014 | Wang | H05B 33/0845 315/307 |
| 2015/0028775 A1 * | 1/2015 | Zudrell-Koch | H05B 33/0851 315/307 |

* cited by examiner

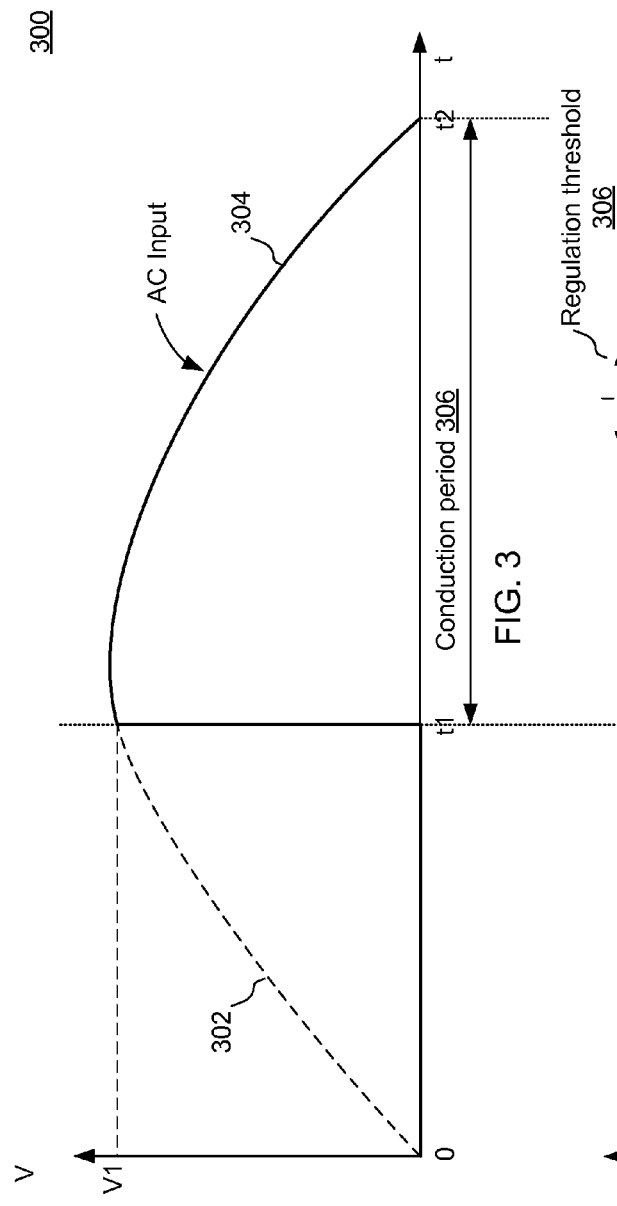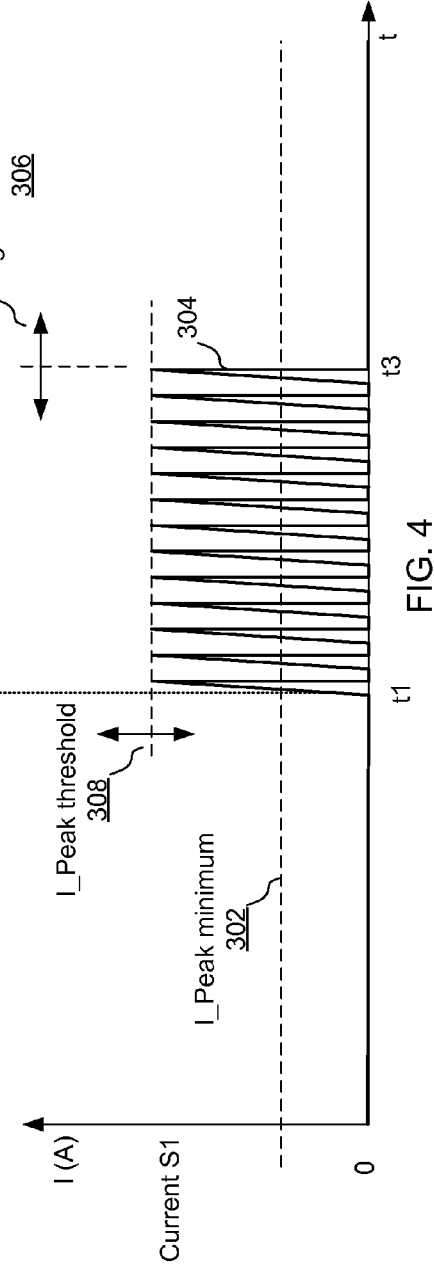

MULTI-MODE CONTROL FOR SOLID STATE LIGHTING

CROSS-REFERENCE TO RELATED APPLICATIONS

This application is the National Stage of International Application No. PCT/US2015/050300, filed on Sep. 15, 2015, which claims the benefit under 35 U.S.C. §119(e) from U.S. Provisional Patent Application No. 62/050,689, filed on Sep. 15, 2014, which is incorporated by reference herein in its entirety.

BACKGROUND

1. Technical Field

The present disclosure relates to driving Light-Emitting Diode (LED) lamps and, more specifically, to regulating the energy supplied to the LED lamp under multiple operating conditions.

2. Description of the Related Arts

A wide variety of electronics applications now use solid state lighting (SSL) devices, such as LED lamps, as replacements for incandescent lamps. These applications include architectural lighting, automotive lighting, backlights for liquid crystal display devices, flashlights, and electronic signs. SSL devices have several advantages compared to incandescent lamps, including higher efficiency, improved directionality, improved reliability, longer life time, and smaller size. Many of these advantages have helped drive the adoption of SSL devices for applications that traditionally use incandescent lamps.

In some applications, however, the adoption of SSL lamps as being suitable replacements compared to other lighting methods has been slow. For example, in applications where the brightness of the light source is adjusted, such as in a dimmable lighting system, methods employed to drive an incandescent lamp, if applied to an LED lamp, may cause the LED lamp to prematurely turn off when the LED lamp is in an ON phase, resulting in a perceivable flicker. Output regulation techniques may be employed to insure a constant light output from the LED to reduce flicker. These techniques, however, often cause the dimmer switch to provide maximum of light output from the LED under all operating conditions. Moreover, LED output regulation control schemes suited for dimmable lighting system may not be suitable for LED lighting systems that do not use dimmer switches.

SUMMARY

Embodiments include a regulation approach that employs firing angle detection to regulate the intensity of energy generated by the SSL lamp under multiple operating conditions and system configurations. A light emitting diode (LED) controller provides a regulated current across an LED from an unregulated voltage source. The LED controller includes a current controller configured to detect an output current at an output of the LED controller, and to detect a firing angle of the received voltage waveform output by an unregulated voltage source or output by a dimmer switch coupled to receive the unregulated voltage source. The current controller is further configured to generate a control signal to turn on or turn off a switch to regulate the amount of current to be supplied to the LEI) during each switching cycle. The current controller detects the firing angle of the received voltage waveform and compares the detected firing angle to one or more specified thresholds. When the detected firing angle is less than a first firing angle threshold, corresponding to a current shaping regulation mode, the current controller generates a control signal to turn off the switch when the detected output current at the output of the LED controller satisfies a first output current threshold. When the detected firing angle of the received voltage waveform is greater than a second firing angle threshold, corresponding to a switching cycle-I_Peak modulation regulation mode, the current controller generates the control signal to turn off the switch when the detected output current at the output of the LED controller satisfies a second output current threshold. And when the detected firing angle of the received voltage waveform is greater than the first threshold and less than the second threshold, corresponding to a hybrid regulation mode, the current controller generates the control signal to turn off the switch when the detected output current at the output of the LED controller satisfies the first output current threshold.

The multi-mode control scheme employed by the disclosed multi-mode controller provides advantages over conventional SSL lamp system controllers. The disclosed multi-mode control scheme combines current shaping, switching cycle modulation, and hybrid regulation modes, and uses hysteresis when switching between modes. Such a control scheme insures sufficient holding current to maintain proper operation of the dimmer switch. Other advantages of the disclosed multi-mode control scheme include improving total harmonic distortion (THD) performance and thus increasing power factor correction (PFC) even when connected via a phase cut dimmer switch, providing a smooth control transition between the disclosed control schemes to prevent light flicker, and insuring consistence performance across multiple types of dimmer switches (e.g., leading, trailing, leading/trailing).

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present disclosure can be readily understood by considering the following detailed description in conjunction with the accompanying drawings.

FIG. 3 describes an operational waveform of an output of a dimmer switch included in the LED lamp system of FIG. 1, in accordance with an embodiment.

FIG. 4 describes operational waveforms of a control signal output by the LED lamp controller of FIG. 1 during a second regulation mode, in accordance with an embodiment.

DETAILED DESCRIPTION OF EMBODIMENTS

The Figures (FIG.) and the following description relate to embodiments of the present disclosure by way of illustration only. It should be noted that from the following discussion, alternative embodiments of the structures and methods disclosed herein will be readily recognized as viable alternatives that may be employed without departing from the principles of the present disclosure.

Reference will now be made in detail to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the embodiments of the disclosure described herein.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

LED Lamp System Overview

Figure 1:
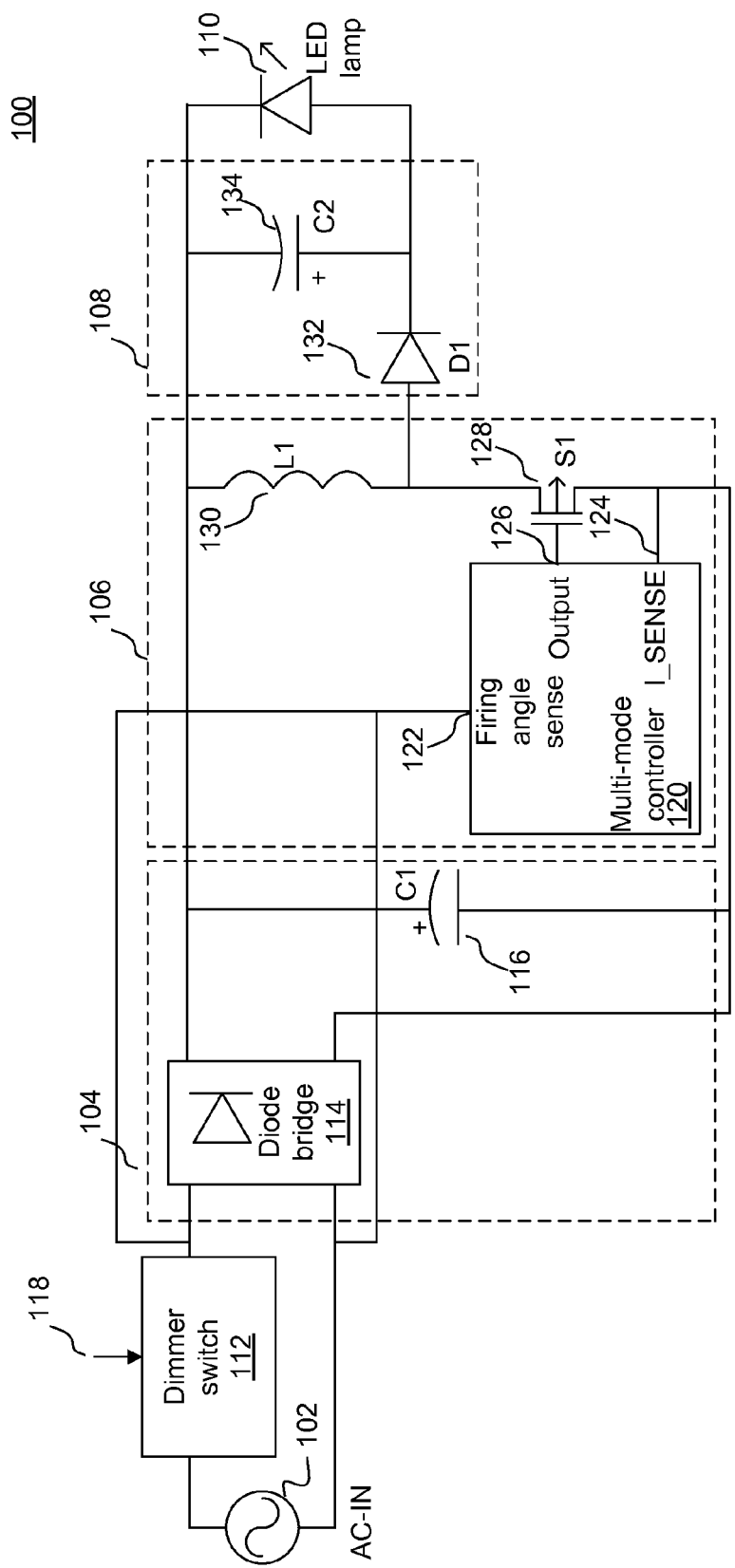
FIG. 1 is a circuit diagram illustrating an LED lamp system comprising an LED lamp controller, in accordance with an embodiment.

FIG. 1 is a circuit diagram illustrating an LED lamp system 100 employing a multi-mode control scheme for providing a regulated output current to an LED lamp in accordance with variety of regulation modes. In the example shown in FIG. 1, the LED lamp system 100 includes an alternating current (AC) input voltage source 102, unregulated DC voltage source 104, power stage 106, output stage 108, and LED lamp 110. In one implementation, the unregulated DC voltage source 104 includes a diode bridge 114 coupled to the output of the AC input voltage source 102, and a bulk capacitor C1 116 having an anode terminal coupled one output terminal of the diode bridge 114 and a cathode terminal coupled to the other output terminal of the diode bridge 114. The diode bridge 114 operates in conjunction with the bulk capacitor C1 116 to generate a rectified input voltage from the AC input voltage source 102.

In one implementation, the diode bridge 114 is coupled to the output of a dimmer switch 112, as shown in FIG. 1. The dimmer switch 112 controls the amount (i.e., intensity) of light output by the LED lamp 110 by phase modulating an AC input voltage 102. In operation, the dimmer switch 112 receives the AC input voltage 102 and generates an output signal having an adjusted root mean square voltage (V-RMS) of the AC input voltage 102. The dimmer switch 112 determines the amount of adjustment applied to the AC input voltage 102 based on the value of a dimming input signal 118. In some implementations, the dimming input signal 118 is an analog signal produced by a knob, slider switch, or other suitable electrical or mechanical device capable of providing an adjustment signal with a variable range of adjustment settings. In other implementations, the dimming input signal 118 is a digital signal. One example of a dimmer switch 112 is described in U.S. Pat. No. 7,936,132, which is incorporated by reference in its entirety.

In one embodiment, the dimmer switch 112 is a TRIAC dimmer that employs phase angle switching to generate an adjusted output voltage for regulating the amount of energy supplied to the LED lamp 110 during each half cycle of the AC input voltage 102. A TRIAC is a bidirectional device that can conduct current in either direction when it is triggered, or turned on. Once fired, the TRIAC operates in a conducting state and current flows to the LED lamp 110. The duration of the conduction state during the half cycle of the AC input voltage 102 waveform is determined by the firing angle of the TRIAC. For example, for a leading edge TRIAC dimmer, when the AC input voltage rises following the zero crossing, the TRIAC dimmer does not generate an output voltage for a period of time until the input waveform reaches a specified phase angle or firing angle. For a trailing edge TRIAC dimmer, during the beginning of each half cycle of the AC input voltage waveform, the TRIAC generates an output signal with a voltage proportional to the sinusoidal AC input voltage waveform until the input waveform reaches a specified firing angle, at which point the TRIAC inhibits output. While the examples and figures describe a leading edge dimmer switch, the disclosed embodiments may also be applied to trailing edges dimmer switches as well. The firing angle of the TRIAC is determined by an RC time constant of a circuit inside the TRIAC. The dimmer setting 118 may be used to adjust the value of the resistance associated with the RC time constant, and thereby adjusting the firing angle of the TRIAC dimmer switch 112. For example, the dimmer setting input 118 may be coupled to a potentiometer or other resistive device configured to have an adjustable value based on an input setting. Once triggered, the TRIAC continues to conduct until the current drops below a certain threshold value, referred to herein as a minimum holding current. For the internal timing of a TRIAC to function properly, current is drawn from the TRIAC in a manner regulated by the power stage 106 that provides a smooth transition in light intensity level output of the LED lamp circuit 110 without perceivable flicker.

The power stage 106 includes a multi-mode controller 120, a power switch S1 128, and an inductor 130. The multi-mode controller 120 regulates the output current provided to the output stage 108 to control the operation of the LED lamp 110. The multi-mode controller 120 is configured to sense the firing angle of the TRIAC dimmer switch 112, determine a regulation mode based on the sensed firing angle, and generate a control signal that causes the switch S1 128 to regulate the amount of current output from the power stage 106. The multi-mode controller 120 includes a firing angle sense input 122, an I_SENSE input 124, and an output 126. The firing angle sense input 122 is coupled to both inputs the of the diode bridge 114 and coupled to a firing angle detection circuit inside the multi-mode controller 120. The firing angle detection circuit is configured to sense the phase cut of the voltage waveform output by the dimmer switch 112, or by the AC input voltage 102 when the dimmer switch 112 is not present, and to generate an indication of the sensed phase cut. The indication of the sensed phase cut is provided to a processor or a controller within the multi-mode controller 120 for determining the appropriate regulation mode at any time during normal operation of the LED lamp system 100, including at start-up. The firing angle detection circuit may include one or more components, such as a voltage sampler, one or more comparators, edge detector, and a phase detector. The voltage sampler is configured to sample a voltage level of the signal sensed at the firing angle sense input 122 at specified sampling rate. In one implementation, the voltage sampler is a digital circuit that samples the input signal at a specified rate sufficient to accurately reproduce the input signal. In other implementations, the voltage sampler may be an analog circuit or a circuit that includes both analog and digital components. The voltage sampler may also include storage to store a specified number of samples for processing by the multi-mode controller 120. The output of the voltage sampler may be provided to one input of a voltage comparator, while the other input of the voltage comparator is coupled to a reference voltage that corresponds to a specified voltage threshold. In one implementation, the specified voltage threshold is 100V for high line voltages (e.g., 220V) and 50V for low line voltages (e.g., 110V). The voltage comparator is configured to generate a signal in a first state if the sampled voltage meets or exceeds the reference voltage and configured to generate a signal in a second state otherwise. An edge detector also receives the sampled voltage waveform and generates a signal indicating the presence of absence of a leading or rising edge in the sampled voltage waveform. In one implementation, the edge detector may utilize existing circuitry included in the multi-mode controller 120 configured to analyze at least two samples of the sampled voltage, determine a voltage value and time stamp for each sample, and compute a change in voltage value over a specified time period based on the analyzed samples. In another implementation, the edge detector is a circuit that includes digital and/or analog components configured detect a change in voltage level of an input signal from a first level to a second level over a specified period of time. The phase detector may be a digital circuit, analog circuit, or a circuit that includes both analog and digital components arranged in a particular manner to accurately detect the phase of the sampled voltage and the AC input voltage 102. The output of the phase detector may be coupled to the input of a phase comparator, while the other input of the phase comparator is coupled to a reference voltage having a value corresponding to a phase threshold. The output of the phase comparator generates a signal indicating whether the phase of the sample voltage waveform meets or exceeds the phase threshold value in a manner similar to the voltage comparator. The outputs signal generated by the voltage sampler, edge detector, comparators, and phase detectors are processed by the controller or processor included in the multi-mode controller 120 to determine the regulation mode of the multi-mode controller as later described with reference to FIG. 5.

In cases where the LED lamp system 100 does not include a dimmer switch 112, the firing angle detection circuit included in the multi-mode controller 120 is configured to detect the absence of a dimmer switch 112. For example, the firing angle detection circuit may be configured to determine the presence or absence of a dimmer switch 112 coupled between the AC input voltage source 102 and the power stage 106, based on the determined conduction period of a half cycle of the waveform output by the diode bridge 114.

The I_SENSE input 124 is coupled to the source terminal of the switch S1 128 and the input of a current sensor circuit included in the multi-mode controller 120. The current sensor circuit senses the input current flowing in the source terminal of the switch S1 128, which corresponds to the current, and provides the output signal 320, which corresponds to the current flowing in the drain terminal of the switch S1 128 when the switch S1 128 is closed or ON. The current flowing in the drain terminal of the switch 120 corresponds to the output current provided to the output stage 108 from the power stage 106. Thus current sensed by the multi-mode controller 120 corresponds to the output current of the output stage 108. In one embodiment, the current sensor senses the current at the I_SENSE input 124 and generates a signal corresponding to the sensed current. An example current sensor is described in U.S. patent application Ser. No. 14/099,986, which is incorporated by reference herein in its entirety.

The switch output 126 is coupled to the gate of switch S1 128 and configured to generate a control signal in accordance with a determined regulation mode to turn on the switch S1 128 responsive to the control signal being in a first state and to turn off the switch S1 128 responsive to the control signal being in a second state. In one implementation, the states of the control signal include a logic "1" and a logic "0." In other implementations, the states of the control signal include at least two different analog signal levels.

The multi-mode controller 120 regulates the output current supplied to the LED lamp 110 by regulating when the switch S1 128 is turned on and turned off in accordance with a determined regulation mode. In one embodiment, the multi-mode controller 120 determines the regulation mode during each switching cycle based on the firing angle of the waveform sensed at the firing angle sense input 122 of the multi-mode controller 120. The multi-mode controller 120 determines the firing angle of the voltage waveform received at the firing angle sense input 122 using the firing angle detection circuit included in the multi-mode controller 120 as previously described. The multi-mode controller 120 selects a regulation mode by comparing the determined firing angle to at least one firing angle threshold stored in the multi-mode controller 120. In one embodiment, a first firing angle threshold may correspond to a first range of 0 degrees to a minimal firing angle. The minimum firing angle may be selected based on the parameters of the lamp system 100. For example, in one implementation the minimum firing angle is selected such that, for the selected minimum firing angle, the peak sensed output current detected at the I_SENSE input is greater than the dimmer switch 112 holding current for the half cycle. In one implementation, the minimum firing angle is 30 degrees. While in other implementations the minimum firing angle may be greater than or less than 30 degrees. The first range may indicate that no dimmer switch 112 is present or that a dimmer switch 112 is present and has a dimmer setting corresponding to a firing angle below the minimum firing angle threshold. A second firing angle threshold may correspond to a firing angle above a maximum firing angle. The maximum firing angle may be selected based on the parameters of the lamp system 100, and in particular selected to such that that peak sensed output current detected at the I_SENSE input is less than the minimum holding current of the dimmer switch 112. In one implementation, maximum firing angle is at least 45 degrees. A third firing angle threshold may correspond to a range between the minimum firing angle and the maximum firing angle. In one embodiment, each of the firing angle thresholds may be modified in accordance with the individual parameters of the lamp system 100. Based on the comparison of the sensed firing angle and one or more of the firing angle threshold, the multi-mode controller 120 selects an associated output current regulation mode.

For example, a first output regulation mode may be selected when the detected firing angle is within the first range of 0 degrees to a specified minimum firing angle. A second output regulation mode may be selected when the detected firing angle exceeds a specified maximum firing angle. A third output regulation mode may be selected by the multi-mode controller 120 when the detected firing angle is in a range between the minimum specified firing angle and the maximum specified firing angle. In other embodiments, the multi-mode controller 120 may select from greater than or less than three output regulation modes, Additionally, the multi-mode controller 120 may use alternative or additional aspects of the detected firing angle to select the appropriate output regulation mode.

The power stage also includes a switch S1 128 as previously described. In one embodiment, the switch S1 128 is a metal oxide field effect transistor (MOSFET) having a source terminal coupled to the cathode terminal of the bulk capacitor C1 116, a drain terminal coupled to that output of the power stage 106, and a gate terminal coupled to the output 126 of the multi-mode controller 120. While a MOSFET switch S1 128 is used as the power switch in the embodiment shown FIG. 1, a BJT (bipolar junction transistor) may also be used as the power switch for regulating the output current supplied to the LED lamp 110 according to other embodiments herein. The power stage 106 also includes an inductor L1 130 having a first terminal connected to the drain terminal of the switch 128 and a second terminal coupled to anode of the bulk capacitor C1 116. The output stage 108 includes the rectifier diode D1 132 and the output capacitor C2 134. The rectifier diode D1 132 has an anode coupled to the drain terminal of the switch 128 and a cathode coupled to the anode of output capacitor C2 134. The output capacitor C2 is connected in parallel across the output of the output stage 108, with the cathode of the output capacitor C2 134 coupled to the anode of the bulk capacitor C1 116.

Multi-Mode Controller for Solid State Lighting

Figure 2:
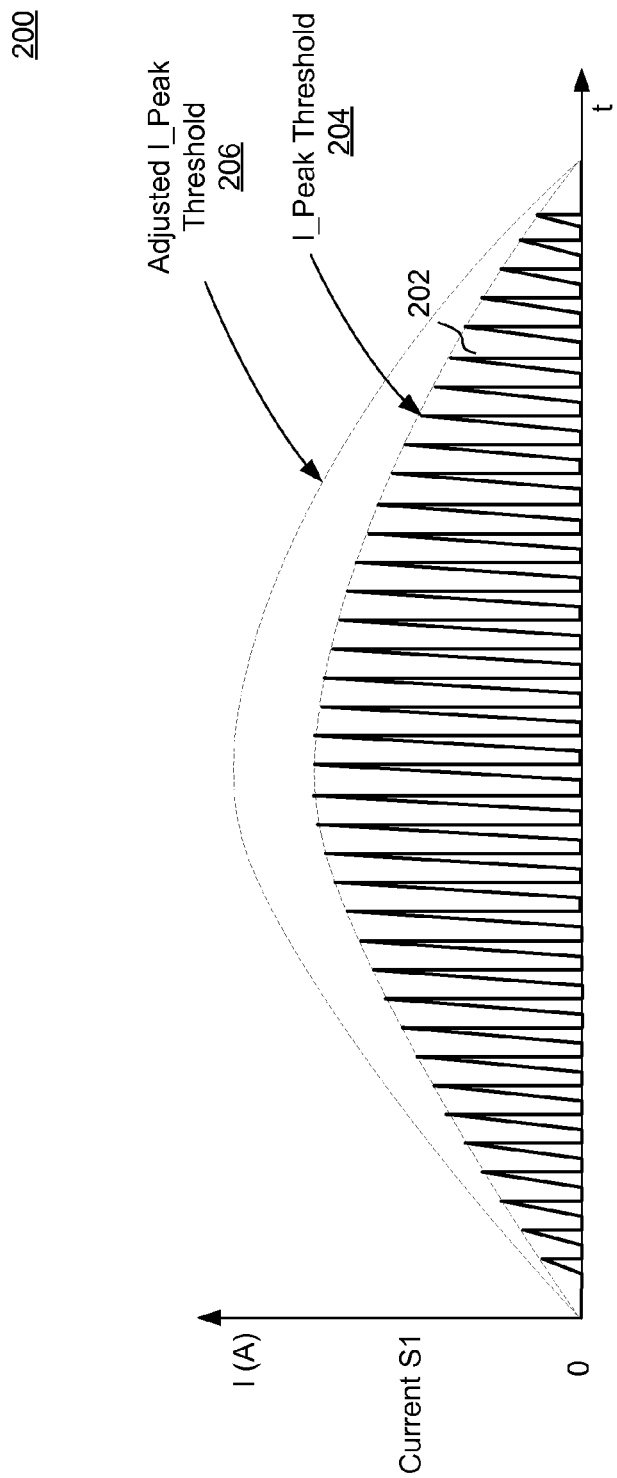
FIG. 2 describes operational waveforms of a control signal output by the LED lamp controller of FIG. 1 during a first regulation mode, in accordance with an embodiment.

The disclosed multi-mode control scheme uses the detected firing angle of an AC input voltage waveform to select from multiple regulation modes. Example regulation modes include AC current shaping, switching cycle and I_Peak modulation, and a hybrid regulation mode, which includes partial I_Peak current shaping, improving THD characteristics while also insuring sufficient load current. FIG. 2 describes operational waveforms 200 of a control signal output by the multi-mode controller 120 during a first regulation mode, in accordance with an embodiment. For LED lamps connected directly to the AC mains, or connected to phase cut dimmer set to a phase cut below a minimum threshold, it is desirable to maintain the lowest THD. FIG. 2 shows the current level 202 through the switch S1 128 during each switching cycle for a half wave of the AC input voltage 102, spanning the time interval beginning at time 0 and ending at time t. For each switching cycle of switch S1 128, the multi-mode controller 120 generates a control signal in a first state to deactivate the switch S1 128 causing the switch to be in an OFF state when it reaches the I_Peak threshold 204. The multi-mode controller 120 senses the current through the source terminal of the switch S1 128 at the I_SENSE input 124, compares the sensed current value to the I_Peak threshold 204 value, and based on the comparison result, generates the control signal in a first state or a second state to deactivate or to activate the switch S1 128. The I_Peak threshold 204 has substantially the same shape as the AC input voltage 102 waveform, resulting in the input current to the LED lamp 110 to be proportional the AC input voltage 102 waveform. During the first regulation mode, the multi-mode controller 120 employs a current shaping regulation scheme to maintain a constant light intensity output regardless of fluctuations of the AC input voltage 102. In one example, the multi-mode controller 120 may increase the I_Peak threshold envelope by selecting and adjusted I_Peak threshold 206. This in turn, causes the multi-mode controller 120 to generate a control signal in the second state to turn off the switch S1 128 at later time than the switch S1 128 would have been turned off when the I_Peak threshold 204 was selected. The opposite effect occurs when the value of the I_Peak threshold 204 envelope is decreased. In that case, the multi-mode controller 120 generates a control signal in the second state to turn off the switch S1 128 at earlier time than the switch S1 128 would have been turned off when the I_Peak threshold 204 was selected. Accordingly, by increasing or decreasing the I_Peak threshold 204 envelope, the multi-mode controller 120 regulates when the switch S1 128 is turned on and turned off to achieve output regulation of the current supplied to the LED lamp 110. Such an output regulation scheme maintains a constant light intensity output of the LED lamp 110 regardless of fluctuations of the AC input voltage 102 and operates to maintain the lowest THD.

FIG. 3 describes an operational waveform of an output of a dimmer switch 112 included in the LEI) lamp system 100, in accordance with an embodiment. FIG. 3 shows a half wave of the AC input voltage 102 superimposed on the AC mains waveform. The portion of the AC mains waveform, indicated by the dotted line, is blocked from the LED lamp 110 when the dimmer switch 112 is in the non-conducting state. The blocked portion 302 of the AC mains waveform spans an interval from time 0 to time t1, at which point the AC mains voltage has a voltage level V1. The unblocked portion 304 of the AC mains waveform, indicated by the solid line marked AC input, represents the output of the dimmer switch 112. The unblocked portion 304 of the AC mains waveform spans an interval from time t1 to time t2 (i.e., conduction period 306), at which point the AC mains voltage has a voltage level V1.

FIG. 4 describes operational waveforms of a control signal output by the multi-mode controller 120 during a second regulation mode that employs switching cycle and I_Peak modulation, in accordance with an embodiment. When the LED lamp 110 is connected to the AC input voltage source 102 via a phase cut dimmer, the multi-mode controller 120 employs a different output regulation scheme from the current shaping scheme described in FIGS. 1 and 3. In such a system configuration, the LED lamp 110 load is maintained above the minimum of holding current of the phase cut dimmer, represented by I_Peak minimum threshold 302. Thus the value of the I_Peak threshold is not necessarily proportional to the AC input voltage 102 waveform as it would be under the current shaping output regulation mode. FIG. 4 illustrates a control method where the switching cycles 304 of buck-boost converter are initiated when the dimmer switch 112 is placed in the conducting state. For each switching cycle 304, the multi-mode controller 120 generates a control signal in a second state to turn off the switch S1 128 when the current detected at the I_SENSE port reaches an I_Peak threshold 306. During the phase cut regulation mode of FIG. 4, the I_Peak threshold 306 is set to satisfy a minimum holding current of the dimmer switch 112. In FIG. 4, the threshold I_Peak minimum 302 corresponds to the minimum holding current of the dimmer switch 112. Setting the I_Peak threshold 306 to greater than the minimum holding current of the dimmer switch 112 ensures that dimmer switch 112 maintains a minimum holding current threshold throughout the conduction period 306. When operating in the switching cycle and I_Peak modulation regulation mode, the multi-mode controller 122 may adjust the point where the switching cycles are terminated within each AC input voltage half cycle, which is illustrated by the regulation threshold 306 about time t3, to provide output regulation. In one implementation, the point where the switching cycle is terminated is adjusted by regulating the number of switching pulses output by the switch S1 128 based on the detected phase. For example, during current shaping regulation mode, one hundred pulses may be generated during each AC input voltage half cycle. During switching cycle and I_Peak modulation, the multi-mode controller 120 may adjust the number of pulses to eighty pulses when the multi-mode controller detects that the dimmer switch 112 is conducting during 80% of the AC input voltage half cycle, and sixty pulses when the multi-mode controller detects that the dimmer switch 112 is conducting during 60% of the AC input voltage half cycle. Alternatively or additionally, the I_Peak threshold may also be raised or lowered to provide a further means of output regulation. In one implementation, the multi-mode controller 122 adjusts the I_Peak threshold 308 during each switching cycle based on the current level sensed at the I_SENSE input 124. For example, the multi-mode controller 122 may compare the measure of current detected at the I_SENSE input 124 and the I_Peak threshold 308. If the measure of the detected current is greater than the I_Peak threshold 308, the multi-mode controller may increase the value of the I_Peak threshold 308 by a specified amount. While, if the measure of the detected current is less than the I_Peak threshold 308, the multi-mode controller may decrease the value of the I_Peak threshold 308 by a specified amount. In other embodiments, such an adjustment may be made one time during a conduction period 306, or may be made by comparing the average value of multiple detected currents during a conduction period for comparison with the I_Peak threshold 308. Generally, the value of the I_peak threshold level is set to be high enough to provide sufficient current to maintain the minimum holding current for the TRIAC device. In one implementation, the value of I_peak threshold is set by a pin configuration. In other implementations, other means of setting the value of I_peak threshold may be used. The phase cut control scheme shown in FIG. 4 may result in high THD and thus lower PFC, but it insures the proper operation of the dimmer switch 112 as it prevents reset of the TRIAC device.

It is desirable to improve the THD performance of the LED lamp system 110, as often times, the dimmer switch 112 is set to provide maximum (or near maximum) light output. The disclosed LEI) lamp system 100 use regulation schemes that employ firing angle detection to regulate the intensity of energy generated by the SSL lamp. For example, to increase the intensity of the light output by the LED lamp 118, the dimmer switch 112 may be adjusted to increase the phase angle (decreasing the phase cut). The multi-mode controller 120 may transition from the regulation scheme shown in FIG. 4 to the regulation scheme shown in FIG. 2 (and vice versa). Such a transition creates challenges. For example, at the boundary of switching control schemes, there may be a noticeable light flicker. More problematic, if the dimmer switch setting caused a phase angle near the threshold where these control schemes are transitioned, there would be a constant back and forth transition, causing light flicker even when the dimmer switch is in the steady state.

Figure 5:
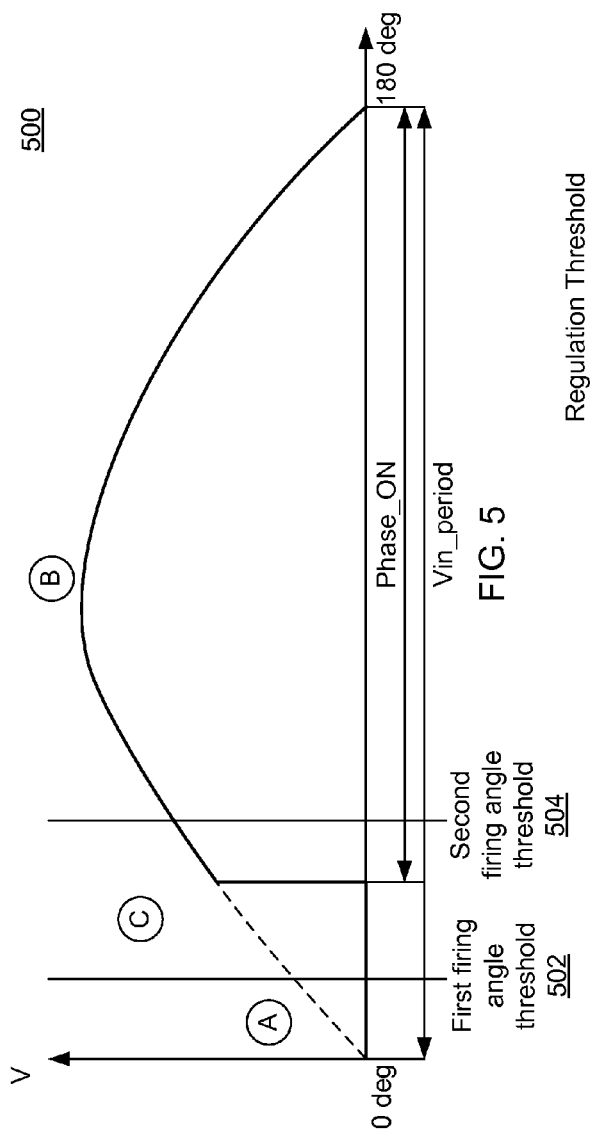
FIG. 5 describes an operational waveform of an output of a dimmer switch included in the LED lamp system of FIG. 1 during a third regulation mode, in accordance with an embodiment.
Figure 6:
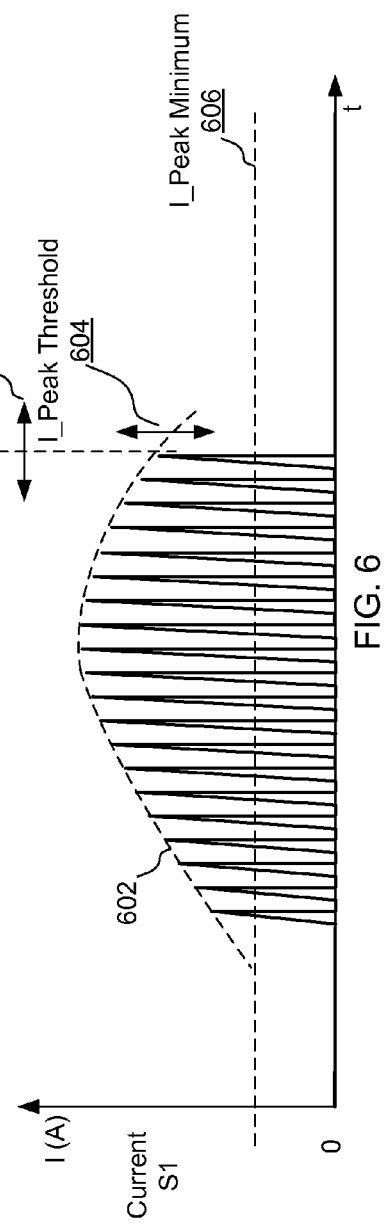
FIG. 6 describes operational waveforms of a control signal output by the LED lamp controller of FIG. 1 during a third regulation mode, in accordance with an embodiment.

The disclosed multi-mode controller 122 also operates in a hybrid regulation mode that allows for improved THD characteristics and for smooth transition between AC current shaping and switching cycle and I_Peak modulation regulation modes. FIGS. 5 and 6 illustrate the operational waveforms of the disclosed hybrid multi-mode control scheme. FIG. 5 shows a half wave of the AC input voltage 102 output from the dimmer switch 112 superimposed on the AC mains waveform. As shown in FIG. 5 the portion of the AC mains signal that is blocked from the LED lamp 110 when the dimmer switch 112 is in the non-conducting state is shown as a dotted line. FIG. 5 also indicates the boundaries between the three regulation modes A, B, and C. The disclosed multi-mode controller 120 uses hysteresis control to switch between regulation modes A, B, and C based on the detected firing angle of the output of the dimmer switch 112. The detected firing angle (i.e., the phase angle at which the TRIAC device turns on) of the output of the dimmer switch 112 may be represented as a percentage of the phase during which the dimmer switch 112 is conducting during an AC input voltage half cycle using the equation Dim_phase=(Phase_ON/Vin_period)*100%. The multi-mode controller 120 employs regulation mode A, corresponding to the disclosed current shaping regulation mode, between 0 degrees and the first firing angle threshold 502 (corresponding to when dim_phase>first firing angle threshold 502 (e.g., 88%)). During current shaping regulation mode, the multi-mode controller 120 employs a non-dimmer mode control because the dimmer switch 112 is conducting during the majority of the half wave of the AC input voltage 102. Such a regulation method achieves higher PF and lower THD compared to regulation modes B and C. Regulation mode B corresponds to the disclosed switching cycle-I_Peak modulation regulation mode and occurs between the second firing angle threshold 504 and 180 degrees. During regulation mode B, dim_phase<second firing angle threshold 504 (e.g., 84%). By operating in regulation mode B, the multi-mode controller 120 provide enough current to the dimmer switch 112 to satisfy the minimum TRIAC holding current. Regulation mode C corresponds to the disclosed hybrid regulation mode and occurs between the first firing angle threshold 502 and the second firing angle threshold 504. During this transient period, the multi-mode controller 120 enters into a hybrid of regulation control modes A and B to achieve smooth transition between current shaping regulation mode and I_Peak modulation regulation mode, and vice versa. While the values of 84% and 88% may be used for the first and second firing angle thresholds, respectively, different values of the first firing angle threshold 502 and second firing angle threshold 504 may be selected based on the parameters of the LED lamp system 100, and in particular based on the minimum holding current of the dimmer switch 112.

As previously described with reference to the multi-mode controller 120 of FIG. 1, the multi-mode controller 120 is configured to select regulation mode A when the LED lamp 110 is connected directly to the AC mains (or when the phase cut is below a minimum threshold corresponding to the first firing angle threshold 502). The multi-mode controller 120 is configured to select regulation mode B when the LED lamp 110 is connected to a dimmer switch 112 and the phase cut is above a maximum level corresponding the second firing angle threshold 504. FIG. 6 describes operational waveforms of a control signal output by the multi-mode controller 120 during a hybrid regulation mode, in accordance with an embodiment. The multi-mode controller 120 employs the hybrid regulation mode when the firing angle of the waveform detected at the firing angle sense input 122 is within the range defined by the first firing angle threshold 502 and the second firing angle threshold 504 as shown in FIG. 5. While operating in regulation mode C, the multi-mode controller 120 employs partial I_Peak current shaping.

In other words, the I_Peak threshold 604 defining the peak current through switch S1 128 for each switching cycle will follow the AC input voltage waveform 602 in a similar manner as described with respect to the current shaping mode described in FIG. 2. Regulation mode C also employs switching cycle modulation. The multi-mode controller 120 is configured to adjust the I_Peak threshold 604 to provide output regulation in a similar manner as described with respect to the operation of the current shaping mode as described in FIG. 2. The multi-mode controller 120 is also configured to adjust the regulation threshold 604 to provide output regulation in a similar manner as described with respect to the switching cycle-I_Peak modulation regulation mode as described in FIG. 4. Additionally, during the hybrid regulation mode, the multi-mode controller 120 may also adjust the I_Peak threshold 604 to insure the LEI) lamp 110 input current exceeds the minimum holding current (corresponding to I_Peak minimum 606) of the dimmer switch 112 in a similar manner as described with respect to switching cycle-I_Peak modulation regulation mode as described in FIG. 4. In one embodiment, a bleeder circuit (not shown) may be used in order to further improve the operating characteristics of the SSL. An example bleeder circuit is described in U.S. Pat. No. 7,936,132, which is incorporated by reference in its entirety.

The disclosed multi-mode control scheme provides improved THD performance when a phase cut dimmer switch is used, and it allows for a smoother transition between regulation modes even when the dimmer switch setting is adjusted. Sensing the phase cut to determine the selected regulation mode can be done at any time during normal operation, including at start-up. While the examples and figures describe a leading edge dimmer switch, the disclosed embodiments may also be applied to trailing edges dimmer switches as well. Generally, for a trailing edge dimmer, the block portion of the AC mains and the conduction portion are switched compared to using a leading edge dimmer. For example, in FIG. 3, the conduction period for a trailing edge dimmer would span from time 0 to time t1, and the blocked portion 302 of the AC mains waveform spans an interval from time t1 to time t2. Otherwise, the operation of the LED lamp system 100 using a trailing edge dimmer operates in a manner similar to the operation of the LEI) lamp system 100 using a leading edge dimmer.

Upon reading this disclosure, those of skill in the art will appreciate still additional alternative designs for controlling dimming of an LED lamp using a multi-mode controller to regulate the energy delivered to the LED lamp. Thus, while particular embodiments and applications of the present disclosure have been illustrated and described, it is to be understood that the disclosure is not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure.

What is claimed is:

1. A light emitting diode (LED) controller providing a regulated current across a LED from an unregulated voltage source, the LED controller comprising:
    a current controller configured to detect an output current at an output of the LED controller; and
    a firing angle detection circuit configured to detect a firing angle of a voltage waveform output by a dimmer switch, the dimmer switch coupled to receive the unregulated voltage source, wherein a firing angle sense input of the firing angle detection circuit is directly connected to both inputs of a diode bridge circuit coupled to the dimmer switch;
    the current controller further configured to:
        generate a control signal to turn on or turn off a switch, the switch being turned on responsive to the control signal being in a first state and the switch being turned off responsive to the control signal being in a second state, the switch configured to receive the control signal and regulate an amount of current to be supplied to the LED based on the control signal, wherein for each switching cycle:
        responsive to the detected firing angle of the voltage waveform output by the dimmer switch being less than a first firing angle threshold, corresponding to a first regulation mode, generate the control signal in the second state when the detected output current at the output of the LED controller satisfies a first output current threshold;
        responsive to the detected firing angle of the voltage waveform output by the dimmer switch being greater than a second firing angle threshold, corresponding to a second regulation mode, generate the control signal in the second state when the detected output current at the output of the LED controller satisfies a second output current threshold; and
        responsive to the detected firing angle of the voltage waveform output by the dimmer switch being greater than the first threshold and less than the second threshold, corresponding to a third regulation mode, generate the control signal in the second state when the detected output current at the output of the LED controller satisfies the first output current threshold.

2. The LED controller of claim 1, wherein during the first regulation mode the first output current threshold waveform has a shape proportional to the voltage waveform output by the dimmer switch.

3. The LED controller of claim 1, wherein the LED controller is further configured to:
    adjust, during the first regulation mode, the first output current threshold to regulate the output current to the dimmer switch.

4. The LED controller of claim 1, wherein during the second regulation mode, the second output current threshold corresponds to a holding current of the dimmer switch.

5. The LED controller of claim 1, wherein the LED controller is further configured to:
    adjust, during the second regulation mode, the second output current threshold to regulate the output current to the dimmer switch.

6. The LED controller of claim 1, wherein during the third regulation mode the first output current threshold waveform has a shape proportional to the voltage waveform output by the dimmer switch.

7. The LED controller of claim 1, wherein the LED controller is further configured to:
    adjust, during the third regulation mode, the first output current threshold to regulate the output current to the dimmer switch, such that the first output current threshold is greater than a minimum holding current of the dimmer switch.

8. A light emitting diode (LED) controller providing a regulated current across a LED from an unregulated voltage source, the LED controller comprising:
    a current controller configured to detect an output current at an output of the LED controller; and a firing angle detection circuit configured to detect a firing angle of the unregulated voltage source, wherein a firing angle sense input of the firing angle detection circuit is directly connected to both inputs of a diode bridge circuit coupled to the unregulated voltage source;

the current controller further configured to:

generate a control signal to turn on or turn off a switch, the switch being turned on responsive to the control signal being in a first state and the switch being turned off responsive to the control signal being in a second state, the switch configured to receive the control signal and regulate an amount of current to be supplied to the LED based on the control signal, wherein for each switching cycle:

responsive to the detected firing angle of the unregulated voltage source being less than a first firing angle threshold, corresponding to a first regulation mode, generate the control signal in the second state based on a first regulation mode when the detected output current at the output of the LED controller satisfies a first output current threshold;

responsive to the detected firing angle of the unregulated voltage source being greater than a second firing angle threshold, corresponding to a second regulation mode, generate the control signal in the second state when the detected output current at the output of the LED controller satisfies a second output current threshold; and responsive to the detected firing angle of the unregulated voltage source being greater than the first threshold and less than the second threshold, corresponding to a third regulation mode, generate the control signal in the second state when the detected output current at the output of the LED controller satisfies the first output current threshold.

9. The LED controller of claim 8, wherein during the first regulation mode the first output current threshold waveform has a shape proportional to the voltage waveform output by the unregulated voltage source.

10. The LED controller of claim 8, wherein the LED controller is further configured to:

adjust, during the first regulation mode, the first output current threshold to regulate the output current to the dimmer switch.

11. The LED controller of claim 8, further comprising a dimmer switch, the dimmer switch having an input coupled to receive the unregulated voltage source, and an output coupled to the LED controller.

12. The LED controller of claim 11, wherein during the second regulation mode, the second output current threshold corresponds to a holding current of the dimmer switch.

13. The LED controller of claim 11, wherein the LED controller is further configured to:

adjust, during the second regulation mode, the second output current threshold to regulate the output current to the dimmer switch.

14. The LED controller of claim 11, wherein during the third regulation mode the first output current threshold waveform has a shape proportional to the voltage waveform output by the dimmer switch.

15. The LED controller of claim 11, wherein the LED controller is further configured to:

adjust, during the third regulation mode, the adjusting first output current threshold to regulate the output current to the dimmer switch, such that the first output current threshold is greater than a minimum holding current of the dimmer switch.

* * * * *

UNITED STATES PATENT AND TRADEMARK OFFICE
CERTIFICATE OF CORRECTION

PATENT NO. : 9,936,547 B2  
APPLICATION NO. : 15/509845  
DATED : April 3, 2018  
INVENTOR(S) : Xiaoyan Wang Page 1 of 1

It is certified that error appears in the above-identified patent and that said Letters Patent is hereby corrected as shown below:

In the Claims

Column 11, Line 60, Claim 1, delete "current across a" and insert -- current across an --.
Column 14, Line 29, Claim 15, delete "the adjusting first output" and insert -- the first output --.

Signed and Sealed this  
Sixteenth Day of July, 2019

Andrei Iancu  
*Director of the United States Patent and Trademark Office*